United States Patent Office 3,187,009
Patented June 1, 1965

3,187,009
1,3-DITHIOLIUM DERIVATIVES AND INTERMEDIATES THEREFOR
Erwin Klingsberg, Mountainside, N.J., assignor to American Cyanamid Company, Stamford, Conn., a corporation of Maine
No Drawing. Filed Mar. 5, 1963, Ser. No. 262,845
8 Claims. (Cl. 260—327)

This invention relates to, and has for its object, the provision of 2-(p-tert.-aminophenyl) - 1,3-dithiolium salts by a new process involving the preparation of new intermediates.

More particularly, this invention relates to the provision of new compounds of the formula:

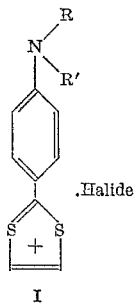

I wherein the R and R' radicals are each individually alkyl of less than eight carbon atoms. These compounds are dyestuffs having high affinity for polyacrylonitrile fibers on which they may be dyed from an aqueous dyebath, employing conventional techniques.

Compounds of Formula I are prepared by a multi-step process from the known compound, 4,5-dicyano-1,3-dithiole-2-thione, having the following formula:

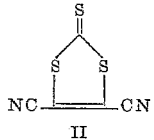

II

In the first step, the dicyano compound of Formula II is hydrolyzed to the corresponding dicarboxamide of the formula:

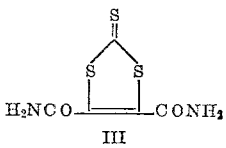

III

This can be accomplished by stirring at room temperature with a strong acid such as conc. HCl. It is surprising that the sensitive dithiole ring proves completely stable under these conditions, while the selective hydrolysis of the cyano groups proceeds only to the carboxamide stage. The product may be purified by recrystallization from an organic solvent such as toluene.

The separated dicarboxamide of Formula III may next be hydrolyzed to the corresponding dicarboxylic acid by refluxing in constant-boiling HCl. It is particularly surprising that the sensitive dithiole ring proves stable under these severe conditions. The resulting 4,5-dicarboxy-1,3-dithiole-2-thione of the formula:

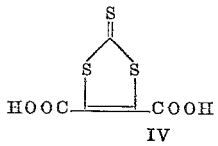

IV can be purified by recrystallization from an organic solvent such as toluene.

Compound IV may be then converted to a compound of Formula V by reacting the former with a lower alkyl halide (e.g., methyl iodide). This unexpected reaction results in the loss of both carboxy groups giving Compound V:

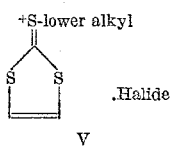

V

Compound V is reacted with a tertiary lower dialkylaniline, eliminating a molecule of lower alkyl mercaptan and giving a dye of Formula I. The condensation may be effected in glacial acetic acid at an elevated temperature. The product can be crystallized from acetic acid.

The following examples are presented to further illustrate the present invention.

EXAMPLE 1
*1,3-dithiole-2-thione-4,5-dicarboxamide*

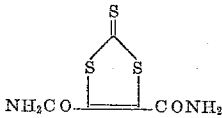

Twenty-four grams (0.130 mole) of 4,5-dicyano-1,3-dithiole-2-thione are stirred for five days in 160 ml. of conc. HCl. Dilution, filtration and recrystallization from toluene gives the bright yellow product.

EXAMPLE 2
*1,3-dithiole-2-thione-4,5-dicarboxylic acid*

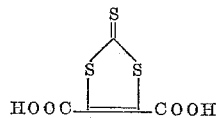

Twenty-seven grams (0.12 mole) of 1,3 - dithiole - 2-thione-4,5-dicarboxamide are stirred and refluxed for four hours in 200 ml. of conc. HCl and 155 ml. of water. Cooling and filtration gives 26.6 g. of the orange product, M.P. 150–152° C. It is crystallized from toluene.

EXAMPLE 3
*1,3-dithiole-2-thione methiodide*

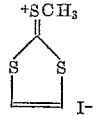

To a solution of 11.1 grams of 1,3-dithiole-2-thione-4,5-dicarboxylic acid in 85 ml. of nitromethane is added 70 ml. of methyl iodide. The resulting solution is stirred and refluxed for eight hours, and the product is separated by filtration.

EXAMPLE 4
*2-(p-dimethylaminophenyl)-1,3-dithiolium iodide*

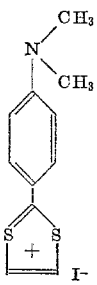

0.55 gram of the product of Example 3 and 0.55 ml. of dimethylaniline are dissolved in 10 ml. of acetic acid with warming, kept on the steam bath one hour, cooled and filtered, giving 0.37 g. of violet needles, M.P. 220–221°. These are recrystallized from acetic acid. The product gives bright pink dyeings on polyacrylonitrile fiber.

I claim:

1. A process for the preparation of a compound of the formula:

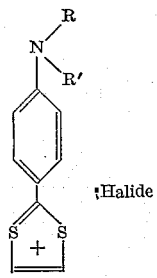

wherein R and R' are alkyl radicals of less than eight carbon atoms; by:
   (a) hydrolyzing 4,5-dicyano-1,3-dithiole-2-thione with a concentrated strong inorganic acid at room temperature to give the product, 4,5-dicarboxamido-1,3-dithiole-2-thione, then
   (b) hydrolyzing the dicarboxamide prepared in step (a) with an aqueous strong acid at reflux temperature to give the compound, 4,5-dicarboxy-1,3-dithiole-2-thione,
   (c) refluxing the compound prepared in (b) with a molar excess of a lower alkyl halide, thereby giving the lower alkyl halide salt of 1,3-dithiole-2-thione, and
   (d) condensing the salt prepared in (c) with a molar quantity of a N,N-dialkylaniline in which the alkyl radicals have less than eight carbon atoms to yield the corresponding compound of the formula.

2. The process of preparing 4,5 - dicarboxamido - 1,3-dithiole-2-thione, by hydrolyzing 4,5-dicyano-1,3-dithiole-2-thione at room temperature with a concentrated strong inorganic acid.

3. The process of preparing 4,5-dicarboxy-1,3-dithiole-2-thione, by refluxing 4,5-dicarboxamido - 1,3 - dithiole-2-thione with an aqueous strong acid.

4. The process of preparing a lower alkyl halide salt of 1,3 - dithiole - 2 - thione, by reacting 4,5 - dicarboxy - 1,3-dithiole-2-thione with a molar excess of a lower alkyl halide.

5. The process of preparing a compound of the formula:

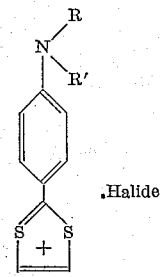

wherein R and R' are each lower alkyl of less than eight carbons, by condensing a lower alkyl halide salt of 1,3-dithiole-2-thione with a molar amount of a N,N-dialkyl-aniline in which the alkyl radicals have less than eight carbon atoms.

6. The compound of the formula:

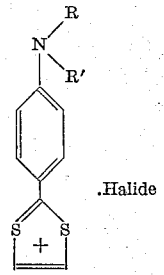

wherein R and R' are radicals of less than eight carbon atoms alkyl.

7. The compound of the formula:

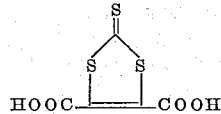

8. The compound of the formula:

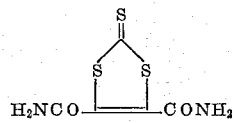

References Cited by the Examiner

Cram et al.: Organic Chemistry, McGraw-Hill Book Co., Inc., 1959, p. 78.

IRVING MARCUS, *Primary Examiner.*

NICHOLAS S. RIZZO, *Examiner.*